United States Patent [19]

Chiang et al.

[11] Patent Number: 5,106,211

[45] Date of Patent: Apr. 21, 1992

[54] FORMATION OF POLYMER CHANNEL WAVEGUIDES BY EXCIMER LASER ABLATION AND METHOD OF MAKING SAME

[75] Inventors: Kophu Chiang, Edison; David Haas, Springfield, both of N.J.

[73] Assignee: Hoechst Celanese Corp., Somerville, N.J.

[21] Appl. No.: 655,015

[22] Filed: Feb. 14, 1991

[51] Int. Cl.⁵ .................... G02B 6/10; G03C 5/00; B23K 26/00; H03F 7/00
[52] U.S. Cl. ...................... 385/132; 385/14; 385/122; 385/131; 385/143; 385/145; 430/321; 219/121.6; 359/328; 359/332
[58] Field of Search ............... 350/96.11, 96.12, 96.13, 350/96.14, 96.34; 430/320, 321; 307/425, 426, 427, 428, 429, 430; 219/121.6, 121.62, 121.61, 121.69; 385/9, 14, 40, 41, 131, 132, 122, 142, 143, 145; 359/328, 330, 332

[56] References Cited

U.S. PATENT DOCUMENTS

| | | | |
|---|---|---|---|
| 4,838,634 | 6/1989 | Bennion et al. | 350/96.12 |
| 4,859,876 | 8/1989 | Dirk et al. | 350/96.34 |
| 4,883,743 | 11/1989 | Booth et al. | 430/321 |
| 4,955,977 | 9/1990 | Dao et al. | 350/96.34 |
| 5,002,361 | 3/1991 | DeMartino et al. | 385/145 |
| 5,006,285 | 4/1991 | Thackara et al. | 350/96.12 |
| 5,015,059 | 5/1991 | Booth et al. | 350/96.17 |
| 5,039,186 | 8/1991 | Man et al. | 385/130 |
| 5,061,028 | 10/1991 | Khanarian et al. | 385/143 |
| 5,062,680 | 11/1991 | Imamura et al. | 385/131 |

Primary Examiner—Brian Healy
Attorney, Agent, or Firm—P. S. Kalyanaraman

[57] ABSTRACT

This invention provides polymeric chanel waveguides which are formed by means of an excimer laser photoablation procedure. The smooth-wall channel waveguides polymeric medium is in combination with polymeric cladding layers to form a laminated matrix. The polymers in the waveguiding medium and the cladding layers of the laminated matrix have side chains which exhibit second order nonlinear optical susceptibility, and which can be molecularly oriented by an electric field.

18 Claims, 6 Drawing Sheets

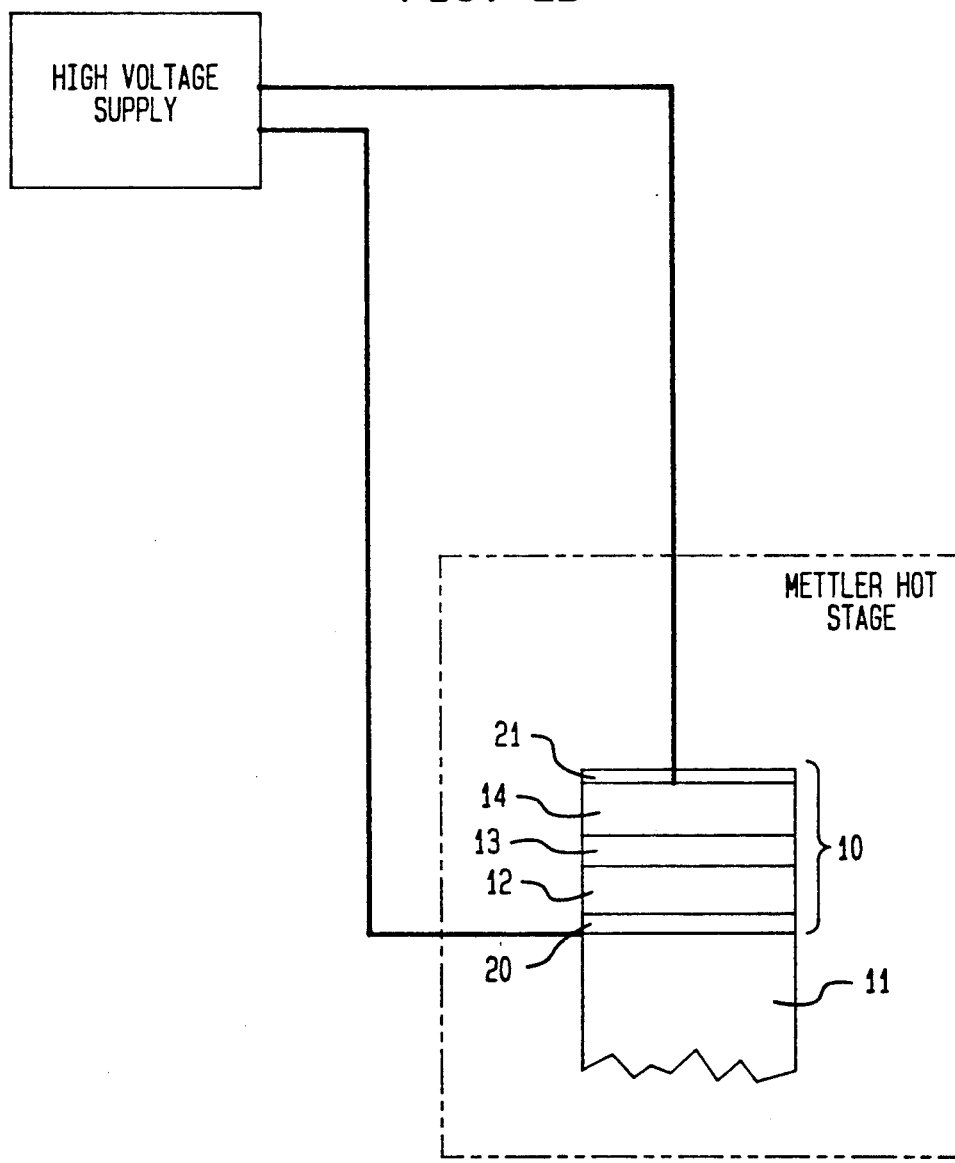

FORMATION OF POLYMER CHANNEL WAVEGUIDES BY EXCIMER LASER ABLATION AND METHOD OF MAKING SAME

BACKGROUND OF THE INVENTION

Optical waveguides consist of a transparent waveguiding core surrounded by transparent materials of lower indices of refraction. Several general methods are utilized for the fabrication of optical waveguides.

In one method optical waveguides are formed by applying a dielectric material to a transparent substrate of lower refractive index.

In another method thermoplastic polymer substrates are embossed with a metal die in a desired waveguide pattern, and subsequently filled or coated with a polymerizable higher index liquid monomer.

In another method optical waveguides are formed by selectively altering the index of refraction of a bulk transparent material. One technique involves ion bombardment in which selected regions of increased refractive index are provided by generating a nonlinear disorder pattern in a bulk matrix. In another technique selected regions of increased refractive index are either photo-induced in sensitized polymeric materials such as poly(methyl) methacrylate as described in Appl. Phys. Lett., 16, 486 (1970), or electrically induced by diffusing a higher index dopant into a transparent material.

Optical waveguides fabricated in GaAs/AlGaAs structures by laser-assisted etching has been reported in Integrated And Guided-Wave Optics, 1989 Technical Digest Series, 4, 64–67 (Optical Society of America).

U.S. Pat. No. 4,842,677 describes excimer laser etching of high resolution conductive patterns involving the use of an organic polymeric resist. Other publications relating to photoablation of organic polymers include J. Appl. Phys., 66(3), 1411 (1989).

Methods of fabricating organic waveguides are a newly evolving technology. There are inherent disadvantages in the practice of the various known methods, such as difficult multi-step procedures which do not provide reliable quality control and reproducibility. Typical organic waveguiding devices exhibit high optical scattering losses.

A review article in Journal Of Lightwave Technology, 7(10), 1445 (1989) describes several polymeric channel waveguide fabrication routes, such as etching methods which include wet chemistry etching, reactive ion etching, excimer laser ablation, and the like.

There is continuing interest in the development of new and improved techniques for the fabrication of organic optical waveguides which overcome some of the inherent deficiencies of optical waveguide formation in transparent organic media.

Accordingly, it is an object of this invention to provide an improved method for the production of organic optical waveguides.

It is another object of this invention to provide a method for the production of polymeric optical waveguides by photoablative means.

It is a further object of this invention to provide process embodiments for the production of side chain polymeric optical waveguides which have a two-dimensional channel or rib waveguiding structure.

Other objects and advantages of the present invention shall become apparent from the accompanying description and Examples.

DESCRIPTION OF THE INVENTION

One or more objects of the present invention are accomplished by the provision of an optical waveguide which comprises a transparent polymeric film and a supporting substrate, wherein the film is comprised of a polymer laminated matrix which has an interior smooth wall channel configuration longitudinally across the film formed by excimer laser beam ablation during fabrication of the laminated matrix, and the channel consists of a side chain polymer waveguiding medium which has a higher refractive index than the proximate polymer laminated matrix; and wherein the polymer in the waveguiding medium has side chains which exhibit second order nonlinear optical susceptibility.

In another embodiment this invention provides an optical waveguide which has a thin film laminated matrix structure comprising:

(a) a substrate which supports a first thin film cladding of a polymer;
(b) a smooth-wall channel configuration which has been ablated within and longitudinally across the first polymer thin film with an excimer laser beam;
(c) a side chain polymer waveguiding medium in the channel which has a higher refractive index than the first polymer thin film cladding; and
(d) a second thin film cladding of a polymer which is in coextensive contact with the channel side chain polymer waveguiding medium, and which has a lower refractive index than the side chain polymer waveguiding medium;

wherein the polymer in the channel waveguiding medium has side chains which exhibit second order nonlinear optical susceptibility.

A cladding thin film can be composed of any thermoplastic polymer which is optically transparent and which as a lower refractive index than the waveguiding medium. Illustrative of a cladding thin film polymer is poly(methyl methacrylate), or a side chain polymer which exhibits second order nonlinear optical susceptibility as described more fully hereinbelow.

In another embodiment this invention provides an electrooptic channel waveguide device which has a thin film laminated matrix structure comprising:

(a) a substrate which supports a first electrode layer;
(b) a first thin film cladding of a side chain polymer in coextensive proximity with the electrode layer;
(c) a smooth-wall channel configuration which has been ablated within and longitudinally across the first polymer thin film with an excimer laser beam;
(d) a side chain polymer waveguiding medium in the channel which has a higher refractive index than the first polymer thin film;
(e) a second thin film of a side chain polymer which is in contact with the channel polymer waveguiding medium, and which has a lower refractive index than the side chain polymer waveguiding medium; and
(f) a second electrode layer which is in coextensive proximity with the second polymer thin film;

wherein the polymers in the channel waveguiding medium and in the cladding thin films have side chains which exhibit second order nonlinear optical susceptibility.

In another embodiment this invention provides a method for constructing an optical waveguide which comprises:

(a) forming a first thin film cladding of a polymer on a supporting substrate;
(b) ablating a smooth-wall channel within and longitudinally across the first polymer thin film with an excimer laser;
(c) filling the channel with a side chain polymer waveguiding medium which has a higher refractive index than the first polymer thin film; and
(d) applying a second thin film cladding of a polymer which is in contact with the channel side chain polymer waveguiding medium, and which has a lower refractive index than the side chain polymer waveguiding medium;

wherein the polymer in the channel waveguiding medium has side chains which exhibit second order nonlinear optical susceptibility.

In another embodiment this invention provides a method for constructing an optical waveguide which comprises:
(a) forming a first thin film cladding of a side chain polymer on a supporting substrate;
(b) forming a side chain polymer optical waveguiding layer in contact with the first thin film;
(c) forming a second thin film cladding of a side chain polymer in contact with the waveguiding layer;
(d) forming a smooth wall channel waveguiding ridge by ablating longitudinal sections of the cladding thin films and waveguiding layer with an excimer laser; and
(e) applying a third thin film cladding of side chain polymer to encompass the channel waveguiding ridge and form a side chain polymer laminated matrix;

wherein the polymers in the waveguiding channel and cladding thin films of the laminated matrix have side chains which exhibit second order nonlinear optical susceptibility, and the channel side chain polymer waveguiding medium has a higher refractive index than the proximate encompassing side chain polymer laminated matrix.

In a further embodiment this invention provides a method for constructing a channel waveguide electrooptic light modulator which comprises:
(a) forming a first thin film metal electrode on a supporting substrate;
(b) forming a first thin film cladding of a nonlinear optically responsive side chain polymer in coextensive proximity with the metal electrode;
(c) forming a nonlinear optically responsive side chain polymer waveguiding layer in contact with the first cladding thin film;
(d) forming a second thin film cladding of a nonlinear optically responsive side chain polymer in contact with the waveguiding layer;
(e) forming a second thin film metal electrode in coextensive proximity with the second cladding thin film;
(f) applying an electric field by means of the two electrodes to the side chain polymer laminated matrix to induce a noncentrosymmetric molecular orientation of the polymer side chains;
(g) forming a smooth wall channel waveguiding ridge by ablating longitudinal side sections of the second metal electrode, cladding thin films and waveguiding layer with an excimer laser; and
(h) applying a third thin film cladding of a nonlinear optically responsive side chain polymer to encompass the channel waveguiding ridge;

wherein the channel side chain polymer waveguiding medium has a higher refractive index than the proximate encompassing side chain polymer laminated matrix.

A present invention optical waveguide can function as a nonlinear optical component in a laser frequency converter, an optical Kerr effect device, an electrooptical Kerr effect device, a degenerate four wave mixing device, an optical interferometric waveguide gate, a wide-band electrooptical guided wave analog-to-digital converter, an all-optical multiplexer, an all-optical demultiplexer, an optical bistable device, an optical parametric device, and the like, as elaborated in U.S. Pat. No. 4,775,215.

The polymeric waveguiding medium in the two-dimensional channel of an invention optical waveguide device is transparent, preferably amorphous in physical properties, and exhibits nonlinear optical response. The channel polymeric waveguiding medium has a higher refractive index (e.g., 1.5) than the surrounding polymeric matrix which interfaces the channel dimensions.

Multiple polymeric thin films in a laminated matrix structure can be applied to the supporting substrate by conventional methods, such as spin coating, spraying, Langmuir-Blodgett deposition, and the like. The thin films typically will have a thickness between about 0.5–6 microns.

A supporting substrate in an invention waveguide can be constructed of any convenient non-conducting medium such as plastic, glass, or silicon.

The term "transparent" as employed herein refers to a polymeric waveguiding medium which is transparent or light transmitting with respect to incident fundamental and created light frequencies. Under operational conditions such as with a frequency converting waveguide device, the polymeric waveguiding nonlinear optical medium is transparent to both the incident and exit light frequencies.

The term "amorphous" as employed herein refers to a transparent polymeric optical medium which does not have a preferred short range molecular order that exhibits optical anisotropy.

The term "external field" as employed herein refers to an electric or magnetic field which is applied to a substrate of mobile side chain polymer molecules, to induce dipolar alignment of the polymer side chains parallel to the field.

The term "smooth wall" as employed herein refers to a channel optical waveguide surface which has a roughness (sigma) less than about 20 nanometers.

Light in a waveguide scatters off of non-smooth waveguide boundaries. Low loss waveguides require relatively smooth surfaces. The required degree of smoothness can be determined from theoretical dependencies of waveguide propagation loss on the boundary roughness. To characterize surface smoothness, both the amplitude of the deviation of the surface and the distance over which this height change occurs needs to be specified. If there is a complex surface with height changes of various magnitudes occurring over various spatial distances, a complete spectrum of amplitude as a function of spatial extent needs to be determined to completely specify the surface. The simplest definition of wall roughness is the root mean square (rms) of the surface position:

$$\sigma = [\int (x-\bar{x})^2 \, d_x d_y \div \int d_x d_y]^{\frac{1}{2}}$$

where x is the height, and z and y are the length coordinates along the surface.

The propagation loss in decibels/centimeter (dB/cm) in a planar waveguide is expressed in Appl. Opt., 10, 2395 (1971) as:

$$\text{Loss in dB/cm} = 4.343 \left[\frac{4 n_g}{\lambda}\right] \sigma^2 \left[\frac{\cos^3(\theta)/\sin(\theta)}{D_{\text{eff}}}\right]$$

where $n_g$ is the guiding layer index, $\lambda$ is the wavelength of the light, $\theta$ is the angle that the light in the waveguide makes with the normal to the guiding to cladding layer boundary, and $D_{\text{eff}}$ is the effective waveguide width made up of the sum of the actual guiding layer width and the decay lengths of the optical field into the two cladding layers.

The formula has been demonstrated to be applicable to the problem of roughness induced loss in channel and rib waveguides in GaAs/AlGaAs systems, as described in Appl. Phys. Lett., 51 (11), 789 (1987) and Appl. Phys. Lett., 53 (16), 1483 (1988).

The radiation energy for photoablating a channel configuration in a side chain polymer thin film during fabrication of an invention optical waveguide is provided by an excimer laser which emits high energy ultraviolet radiation at a fixed wavelength. The radiation energy at a selected wavelength is absorbed by the side chain polymer thin film, and the thin film ablates to the desired depth and pattern in accordance with a programmed application.

Rare gas-halide excimer lasers are suitable for the purposes of the present invention optical waveguide fabrication. ArF, KrF, XeCl and XeF excimer lasers generate wavelengths of 193 nm, 248 nm, 308 nm and 351 nm, respectively. Excimer lasers are commercially available, and the properties of excimer lasers are described in Photonics Spectra, 19, 73 (1985), and in U.S. Pat. Nos. 4,817,096 and 4,842,677.

In applying the radiation energy of an excimer laser to a photoablatable side chain polymer thin film, the radiation is emitted in controlled pulses with a specific repetition rate (e.g., 100 Hz), pulse duration (e.g., 20 nanoseconds), and intensity (e.g., 0.1-20 Joules per square centimeter).

A present invention two-dimensional channel waveguide typically will have dimensions in the range of about 1.5-8 μm × 1.5-8 μm × 0.5-5 cm, and under wave propagating conditions will exhibit an optical loss of less than 1.0 dB/cm.

A present invention optical waveguided laminated matrix preferably has side chain polymers in the waveguiding channel and the cladding thin films which are characterized by a recurring monomeric unit corresponding to the formula:

where P' is a polymer main chain unit, S' is a flexible spacer group having a linear chain length of between about 2-20 atoms, M' is a pendant group which exhibits second order nonlinear optical susceptibility, and where the pendant groups comprise at least about 25 weight percent of the polymer, and the polymer has a glass transition temperature or softening point above about 80° C.

Among the preferred types of side chain polymers are those characterized by a recurring monomeric unit corresponding to the formula:

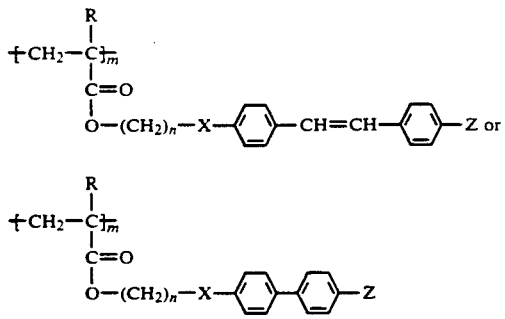

where m is an integer of at least 5; n is an integer between about 2-20; X is —NR—, —O— or —S—; R is hydrogen or a $C_1$-$C_4$ alkyl; and Z is —$NO_2$, —CN, —$CF_3$, —CH=C(CN)$_2$, —C(CN)=C(CN)$_2$ or —$SO_2CH_3$.

Side chain polymers of interest are described in U.S. Pat. Nos. 4,894,066; 4,762,912; 4,779,961; 4,801,670; and 4,808,332. Illustrative of side chain polymer species are poly[6-(4-nitrobiphenyloxy)hexyl methacrylate], poly(L-N-p-nitrophenyl-2-piperidinemethyl acrylate), and stilbene-containing polymers such as a copolymer of 4-[N-(2-methacroyloxyethyl)-N-methylamino]-4'-nitrostilbene and a $C_1$-$C_6$ alkyl acrylate or methacrylate:

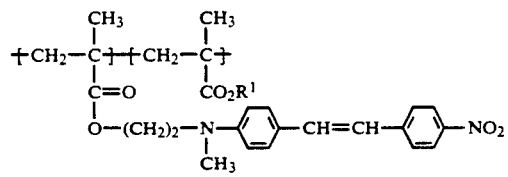

Useful amorphous side chain polymers are described in copending patent application Ser. No. 468,676 filed Jan. 23, 1990, now U.S. Pat. No. 5,002,361.

Poling of a present invention optical waveguide laminated matrix of side chain polymers in the waveguiding channel and the cladding thin films can be accomplished conveniently by heating the matrix near its melting point or glass transition temperature, then applying a DC electric field (e g., 50-150 V/μm) to the matrix to align side chain dipoles in a uniaxial orientation. The matrix then is cooled while the matrix is still under the influence of the applied DC electric field. In this manner a stable and permanent molecular orientation is immobilized in a rigid structure within the poled domains.

The poling can be applied to a substrate supported side chain polymer matrix by an appropriate placement of upper and lower electrode units, where one of which may have a grating configuration.

The thin film electrode layers in an optical waveguide matrix typically are composed of a conductive medium such as aluminum, silver or gold. A thin film metal electrode can be applied by electron beam vacuum deposition means, and normally will have a thickness between about 0.1-1 micron. For quasiphase matching of propagation wave energy, at least one electrode of an electrode set in an optical waveguide matrix has a spatial periodic grating pattern.

DC electric field poling of the side chain polymer medium in a waveguiding channel in the form of a spatial periodic pattern induces molecular orientation of the polymer side chains parallel to the direction of the electric field. The poling establishes a macroscopic noncentrosymmetry in the poled domains of the polymer medium, and establishes second order nonlinear optical susceptibility in the polymer medium.

BRIEF DESCRIPTION OF THE INVENTION

FIGS. 1a–c and FIGS. 2a–e are cross-sectional side elevation schematic views illustrating embodiments for the fabrication of polymeric channel waveguide devices in accordance with the present invention.

DETAILED DESCRIPTION OF THE INVENTION

The following examples are further illustrative of the present invention. The optical waveguide device components are presented as being typical, and various modifications in design and operation can be derived in view of the foregoing disclosure within the scope of the invention.

EXAMPLE I

This Example illustrates the fabrication of an invention polymeric channel waveguide as represented in FIG. 1.

Referring to the figures, a silicon wafer 11 is coated with a 4 micron thin film 12 of a 4-[N-(2-methacroyloxyethyl)-N-methylamino]-4'-nitrostilbene/methyl methacrylate (35/65) copolymer by spinning a 23% by weight solution in cyclohexanone at 3000 rpm for 20 seconds. The copolymer has a $T_g$ of about 133° C. and a weight average molecular weight of about 140,000.

The coated wafer is baked at 160° C. for 2 hours, and then at 130° C. for 1 hour in a nitrogen purged convection oven.

A 2 micron waveguiding layer 13 of the same type copolymer (50/50 molar ratio) is spun from a 20% solution in cyclohexanone at 2000 rpm. The 50/50 copolymer has a $T_g$ of about 138° C. and a weight average molecular weight of about 145,000. The coated structure is baked in the manner previously described.

Figure 1A:
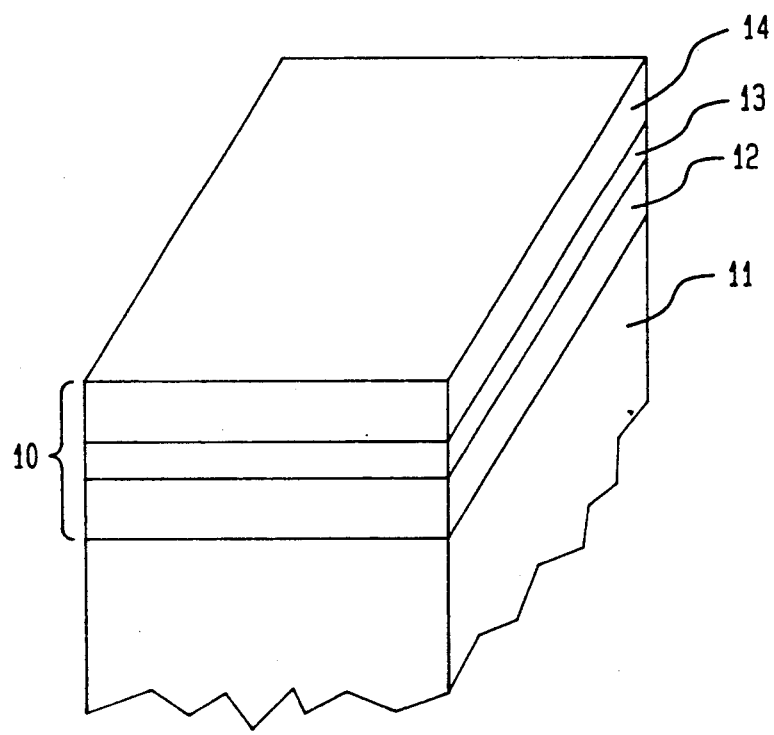

A 3 micron thin film 14 of the same copolymeric composition (35/65) as thin film 12 is spun onto waveguiding layer 13, and the resultant laminated matrix 10 is baked in the manner previously described. The structure is shown in FIG. 1a.

Radiation 25 from a Lambda Physik 193 nanometer excimer laser is passed through a 100 micron by 100 micron aperture and imaged on the upper surface of laminated matrix 10. The laser in a pulsed mode with a 50 Hertz repetition frequency, and a power density of about one Joule/cm² incident on the surface area during each 20 nanosecond pulse.

Laminated matrix 10 is translated through the image plane of the aperture at a rate of one millimeter per second, while removing a 100 micron wide channel zone 16 from laminated matrix 10. The scan is continued for a distance of about one centimeter across the longitudinal length of the structure.

Figure 1B:
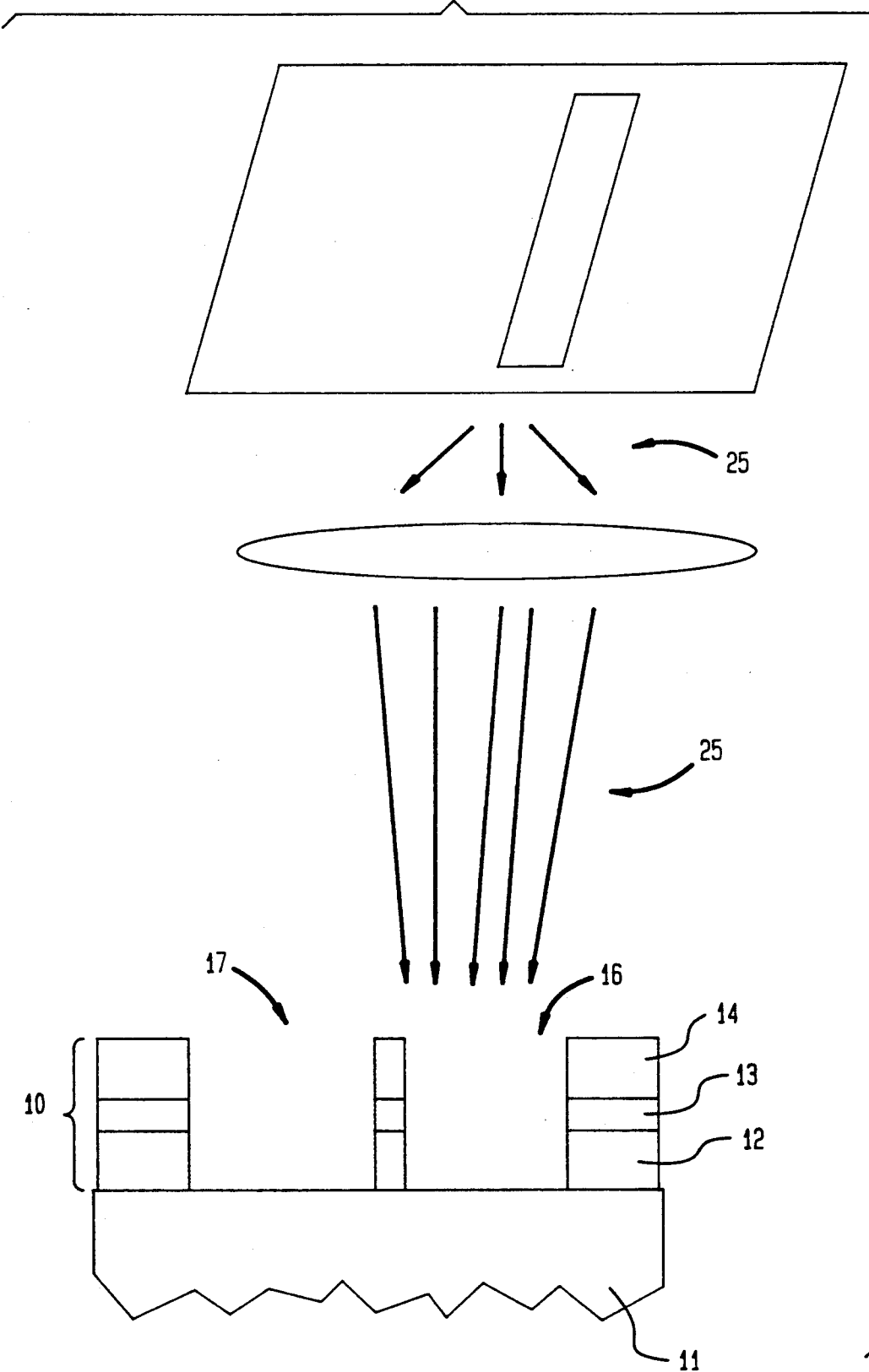

A second channel zone 17 is ablated across laminated matrix 10, at a parallel distance of 6 microns from first channel zone 16, as shown in FIG. 1b.

A mixture of copolymer (50/50) and copolymer (35/65) is blended in a proportion to provide an optical medium which has a refractive index 0.007 less than that of copolymer (50/50).

Figure 1C:
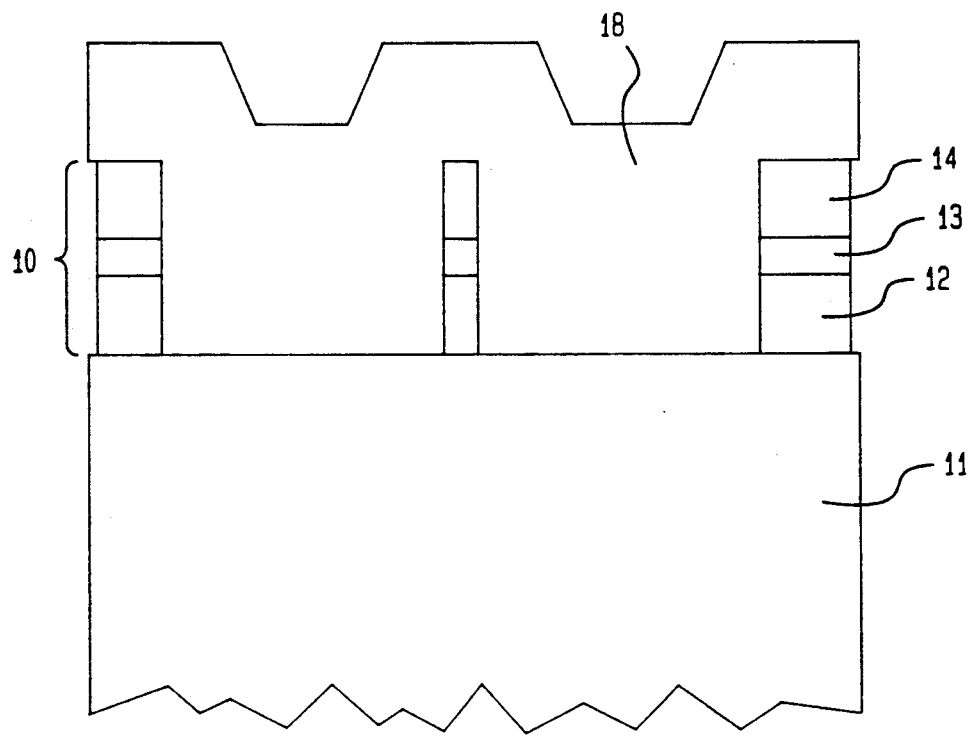

Cladding layer 18 of the polymer blend is spin-coated on laminated matrix 10 as shown in FIG. 1C. The final laminated matrix 10 structure is baked in the manner previously described.

EXAMPLE II

This Example illustrates the fabrication of an invention polymeric channel waveguide electrooptic light modulator as represented in FIG. 2.

Silicon wafer 11 is coated with gold electrode layer 20 by electron beam vacuum deposition.

Figure 2A:
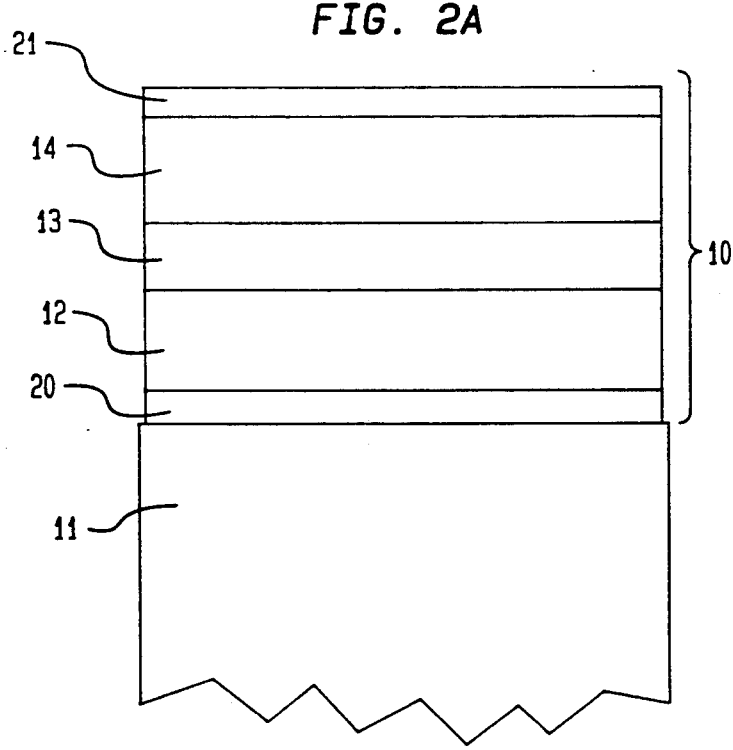

Cladding thin film 12, waveguiding layer 13 and cladding thin film 14 are spin-coated on gold electrode layer 20 in the manner described in Example I. Gold electrode layer 21 is deposited on upper cladding thin film 14 as shown in FIG. 2a.

The fabricated laminated matrix 10 is placed in a Mettler hot stage, and the unit is raised to 140° C. at 1° C./min. A DC field of 100 V/μm is applied across the cladding and waveguiding layers for ten minutes by means of the metal electrodes as shown in FIG. 2b. The electric field is maintained while laminated matrix 10 is cooled to room temperature at 1° C./min.

Figure 2C:
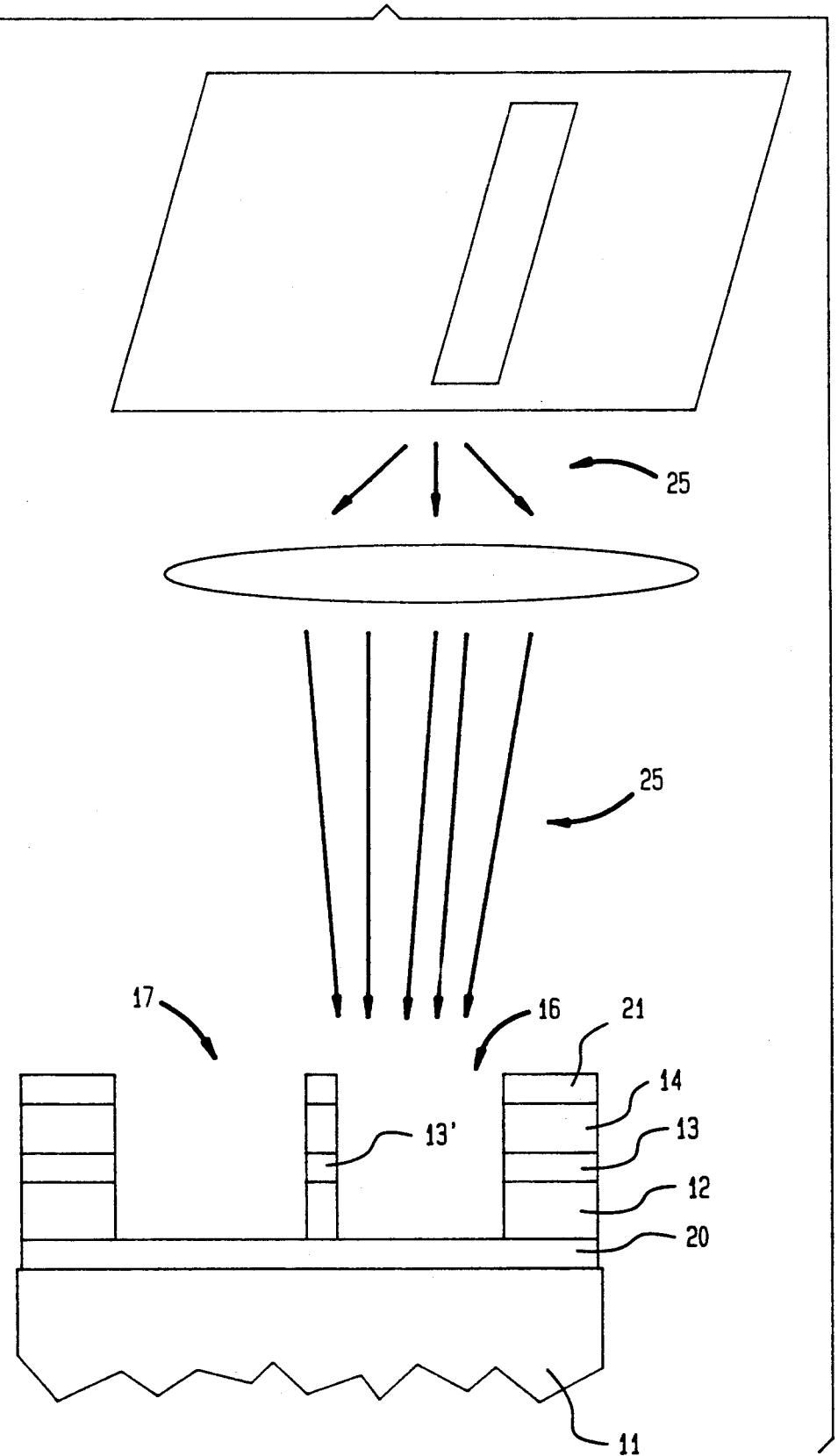

Poled laminated matrix 10 is exposed to radiation 25 to photoablate channel zones 16 and 17 as shown in FIG. 2c.

Figure 2D:
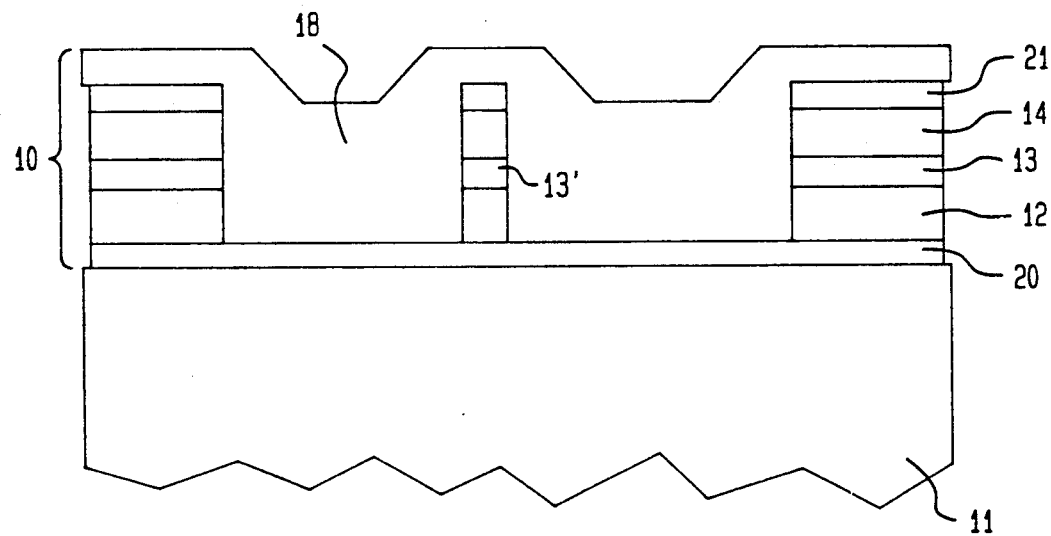

Following the procedure of Example I, cladding layer 18 is spin-coated on laminated matrix 10 as shown in FIG. 2d.

Laminated matrix 10 is cleaved at opposite ends with a focussed excimer laser beam to provide two sharp faces to couple light in and out of the 5 mm long waveguiding channel 13'. The linear electrooptic coefficient r of waveguiding channel 13' is 12 pm/V as measured at 1.3 μm wavelength.

What is claimed is:

1. An optical waveguide which comprises a transparent polymeric film and a supporting substrate, wherein the film is comprised of a polymer laminated matrix which has an interior smooth wall channel configuration longitudinally across the film formed by excimer laser beam ablation during fabrication of the laminated matrix, and the channel consists of a side chain polymer waveguiding medium which has a higher refractive index than the proximate polymer laminated matrix; and wherein the polymer in the waveguiding medium has side chains which exhibit second order nonlinear optical susceptibility.

2. An optical waveguide which has a thin film laminated matrix structure comprising:
   (a) a substrate which supports a first thin film cladding of a polymer;
   (b) a smooth-wall channel configuration which has been ablated within and longitudinally across the first polymer thin film with an excimer laser beam;
   (c) a side chain polymer waveguiding medium in the channel which has a higher refractive index than the first polymer thin film; and
   (d) a second thin film cladding of a polymer which is in coextensive contact with the channel side chain polymer waveguiding medium, and which has a lower refractive index than the side chain polymer waveguiding medium;

wherein the polymer in the channel waveguiding medium has side chains which exhibit second order nonlinear optical susceptibility.

3. An electrooptic channel waveguide device which has a thin film laminated matrix structure comprising:
(a) a substrate which supports a first electrode layer;
(b) a first thin film cladding of a side chain polymer in coextensive proximity with the electrode layer;
(c) a smooth-wall channel configuration which has been ablated within and longitudinally across the first polymer thin film with an excimer laser beam;
(d) a side chain polymer waveguiding medium in the channel which has a higher refractive index than the first polymer thin film;
(e) a second thin film cladding of a side chain polymer which is in contact with the channel side chain polymer waveguiding medium; and
(f) a second electrode layer which is in coextensive proximity with the second polymer thin film;
wherein the polymers in the channel waveguiding medium and in the cladding thin films have side chains which exhibit second order nonlinear optical susceptibility.

4. An electrooptic waveguide device in accordance with claim 3 wherein the side chains of the polymers in the waveguiding channel and the thin films have an electric field-induced noncentrosymmetric molecular orientation.

5. An electrooptic waveguide device in accordance with claim 3 wherein at least one of the electrodes has a spatial periodic grating pattern.

6. A waveguide device in accordance with claim 3 wherein the channel waveguiding medium is optically nonlinear and has a spatial periodic structure for nonlinear optical coefficient modulation and quasi-phase matching of propagating wave energy, and is adapted for frequency doubling, parametric amplification or parametric frequency conversion of an incident laser beam.

7. An electrooptic waveguide device in accordance with claim 3 wherein the cladding thin films consist of a homogeneous blend of at least two side chain polymers.

8. An electrooptic waveguide device in accordance with claim 3 wherein each of the side chain polymers in the channel waveguiding medium and the cladding thin films is characterized by a recurring monomeric unit corresponding to the formula:

where P' is a polymer main chain unit, S' is a flexible spacer unit having a linear chain length between about 2-20 atoms; M' is a pendant group which exhibits second order nonlinear optical susceptibility, and where the pendant side chains consist of at least 25 percent of the polymer, and the polymer has a glass transition temperature above about 80° C.

9. An electrooptic waveguide device in accordance with claim 8 wherein the M' group in the formula contains a biphenyl structure.

10. An electrooptic waveguide device in accordance with claim 8 wherein the M' group in the formula contains a stilbene structure.

11. An electrooptic waveguide device in accordance with claim 8 wherein the side chain polymer in the waveguiding channel medium is characterized by a recurring monomeric unit corresponding to the formula:

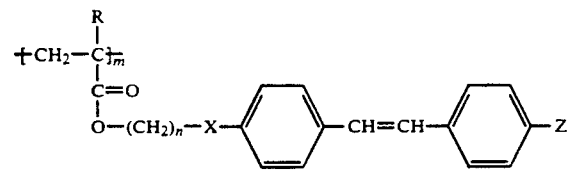

where m is an integer of at least 5; n is an integer between about 2-20; X is $-NR-$, $-O-$ or $-S-$; R is hydrogen or a $C_1-C_4$ alkyl; and Z is $-NO_2$, $-CN$, $-CF_3$, $-CH=C(CN)_2$, $-C(CN)=C(CN)_2$ or $-SO_2CF_3$.

12. An electrooptic waveguide device in accordance with claim 8 wherein the side chain polymer in the channel waveguiding medium is a copolymer of 4-[N-(2-methacroyloxyethyl)-N-methylamino]-4'-nitrostilbene and a $C_1-C_6$ alkyl acrylate or methacrylate.

13. An electrooptic waveguide device in accordance with claim 8 wherein the device is adapted to perform with an optical loss in the channel waveguiding medium of less than about two decibels per centimeter under light wave propagating conditions.

14. A method for constructing an optical waveguide which comprises:
(a) forming a first thin film cladding of a polymer on a supporting substrate;
(b) ablating a smooth-wall channel within and longitudinally across the first polymer thin film with an excimer laser;
(c) filling the channel with a side chain polymer waveguiding medium which has a higher refractive index than the first polymer thin film; and
(d) applying a second thin film cladding of a polymer which is in contact with the channel side chain polymer waveguiding medium, and which has a lower refractive index than the side chain polymer waveguiding medium;
wherein the polymer in the channel waveguiding medium has side chains which exhibit second order nonlinear optical susceptibility.

15. The method in accordance with claim 14 wherein the side chains of the polymer in the waveguiding channel have an external field-induced noncentrosymmetric molecular orientation.

16. A method for constructing an optical waveguide which comprises:
(a) forming a first thin film cladding of a side chain polymer on a supporting substrate;
(b) forming a side chain polymer optical waveguiding layer in contact with the first thin film;
(c) forming a second thin film cladding of a side chain polymer in contact with the waveguiding layer;
(d) forming a smooth wall channel waveguiding ridge by ablating longitudinal sections of the cladding thin films and waveguiding layer with an excimer laser; and
(e) applying a third thin film cladding of side chain polymer to encompass the channel waveguiding ridge and form a side chain polymer laminated matrix;

wherein the polymers in the waveguiding channel and cladding thin films of the laminated matrix have side chains which exhibit second order nonlinear optical susceptibility, and the channel side chain polymer waveguiding medium has a higher refractive index than the proximate encompassing side chain polymer laminated matrix.

17. The method in accordance with claim 16 wherein the side chains of the polymers in the waveguiding and the proximate laminated matrix have an electric field-induced noncentrosymmetric molecular orientation.

18. A method for constructing a channel waveguide electrooptic light modulator which comprises:
   (a) forming a first thin film metal electrode on a supporting substrate;
   (b) forming a first thin film cladding of a nonlinear optically responsive side chain polymer in coextensive proximity with the metal electrode;
   (c) forming a nonlinear optically responsive side chain polymer waveguiding layer in contact with the first cladding thin film;
   (d) forming a second thin film cladding of a nonlinear optically responsive side chain polymer in contact with the waveguiding layer;
   (e) forming a second thin film metal electrode in coextensive proximity with the second cladding thin film;
   (f) applying an electric field by means of the two electrodes to the side chain polymer laminated matrix to induce a noncentrosymmetric molecular orientation of the polymer side chains;
   (g) forming a smooth wall channel waveguiding ridge by ablating longitudinal side sections of the second metal electrode, cladding thin films and waveguiding layer with an excimer laser; and
   (h) applying a third thin film cladding of a nonlinear optically responsive side chain polymer to encompass the channel waveguiding ridge;

wherein the channel side chain polymer waveguiding medium has a higher refractive index than the proximate encompassing side chain polymer laminate matrix.

* * * * *